(12) United States Patent
Kynnös

(10) Patent No.: US 12,077,921 B2
(45) Date of Patent: Sep. 3, 2024

(54) SELF-LEVELING EMBEDDED ROAD SURFACE SENSOR

(71) Applicant: Vaisala Oyj, Helsinki (FI)

(72) Inventor: Kimmo Kynnös, Vantaa (FI)

(73) Assignee: Vaisala Oyj, Helsinki (FI)

( * ) Notice: Subject to any disclaimer, the term of this patent is extended or adjusted under 35 U.S.C. 154(b) by 401 days.

(21) Appl. No.: 17/650,328

(22) Filed: Feb. 8, 2022

(65) Prior Publication Data

US 2022/0251789 A1    Aug. 11, 2022

(30) Foreign Application Priority Data

Feb. 10, 2021    (EP) .................................... 21156246

(51) Int. Cl.
*E01C 23/00*    (2006.01)
*E01C 23/01*    (2006.01)
*G01B 11/06*    (2006.01)
*G01K 13/00*    (2021.01)

(52) U.S. Cl.
CPC .............. *E01C 23/01* (2013.01); *G01B 11/06* (2013.01); *G01K 13/00* (2013.01)

(58) Field of Classification Search
CPC ......... E01C 23/01; E01C 23/18; G01B 11/06; G01K 13/00; E01F 11/00
See application file for complete search history.

(56) References Cited

U.S. PATENT DOCUMENTS 5,853,263 A * 12/1998 Green ..................... E01C 23/18
404/94
2008/0130416 A1* 6/2008 Kalbhenn ................ G10K 9/20
367/174

FOREIGN PATENT DOCUMENTS

DE    102017210907 A1    1/2019
WO    2015193812 A2    12/2015
WO    2015193812 A3    12/2015

OTHER PUBLICATIONS

European Search Report in European Application No. EP 21156246 dated Jun. 23, 2021.

* cited by examiner

*Primary Examiner* — Abdullahi Nur

(74) *Attorney, Agent, or Firm* — MASCHOFF BRENNAN; Paul G. Johnson

(57) ABSTRACT

An example road sensor apparatus comprises: a sensor casing comprising a first surface for interfacing environmental conditions on a surface of a pavement, a second surface for interfacing a sensor level adjustment element, and a sensor portion including one or more sensor apparatuses; the sensor level adjustment element comprising plastic material that exhibits permanent compression in response to being subjected to a pressure that exceeds a threshold pressure and having a first surface for interfacing the sensor casing and a second surface for interfacing a bottom of a recess in the pavement; and an installation sleeve, the sensor casing and the sensor level adjustment element arranged adjacent to each other and at least the sensor casing arranged within the installation sleeve such that the sensor casing is moveable with respect to the installation sleeve in response to a pressure that exceeds said threshold pressure being applied on its first surface.

23 Claims, 3 Drawing Sheets

SELF-LEVELING EMBEDDED ROAD SURFACE SENSOR

CROSS REFERENCE TO RELATED APPLICATION

This application claims the benefit of and priority to European Application No. 21156246.7, filed Feb. 10, 2021, which is incorporated herein by reference.

TECHNICAL FIELD

The example and non-limiting embodiments of the present invention relate to a sensor apparatus that may be embedded in a road surface for monitoring conditions on the road surface.

BACKGROUND

Areas intended for vehicular traffic, such as streets, roads, runways of airports, etc. are typically covered by a durable surface material to withstand the wear and tear resulting over time due to traffic on the area and the mechanical abrasion resulting from maintenance operations applied on the surface material especially in winter conditions. Such surface material may be referred to as road surface or pavement and it may comprise e.g. asphalt and/or concrete.

In many scenarios, knowledge of conditions on the road surface is important for vehicles to make use of the area covered by the road surface in an efficient and safe manner. Particular examples in this regard include streets and roads experiencing high traffic as well as runways on airports. Such information may be readily applicable by drivers or pilots of vehicles rolling on the road surface while such information is valuable for estimating the need for road surface maintenance operations, especially in temperatures around zero degree Celsius.

A known solution for monitoring conditions on the road surface involves usage of a road sensor that is embedded in the road surface to measure characteristics of interest on the road surface, such as temperature on the surface, a thickness of a water layer (possibly) residing on top of the surface, an amount of a predefined chemical (applied for road maintenance, such as de-icing) on the surface, etc. The road sensor may be able to report its measurement data to a central unit, which may process the measurement data into a human-readable format. Typically, such road sensors are applied in an arrangement of a plurality of road sensors embedded in the road surface across an area of interest, where each road sensor reports its measurement data to the central unit, which combines the measurement data from the plurality of road sensors and derives a report or other indication of the measured conditions on the road surface.

However, due to inevitable wear of the road surface over time due to traffic rolling over them, a road sensor embedded therein may gradually become exposed, at some point to an extent that makes it protrude from the road surface. While this is likely to compromise measurement performance of the road sensor, it also makes the road sensor susceptible to damage due to being exposed to increased impact by wheels of vehicles rolling over it. Moreover, in conditions where temperatures are likely to drop below zero degrees Celsius, maintenance equipment such as snow plows are typically applied to ensure safe traffic conditions: such maintenance puts a road sensor protruding from the road surface at a significantly higher risk of damage due to impact from the maintenance equipment, while the maintenance may further increase the wear of the road surface. On the other hand, such operating conditions are ones where reliable information on conditions on the road surface may be most critical.

A straightforward known solution to address the issues discussed above involves regular maintenance of the road sensors by a technician visiting on the site to check and, if needed, adjust positions of the road sensors such that they are embedded deep enough into the road surface to avoid unnecessary impacts by the traffic and maintenance operations.

SUMMARY

It is an object of the present invention to provide a road sensor that can be embedded into a road surface and that enables uncompromised measurement performance and avoidance of damage for a prolonged period of time.

According to an example embodiment, a road sensor apparatus for installation in a recess arranged in a pavement for measuring one or more environmental characteristics on a surface of the pavement is provided, the road sensor apparatus comprising: a sensor casing comprising a first surface for interfacing environmental conditions on the surface of the pavement, a second surface for interfacing a sensor level adjustment element, and a sensor portion including one or more sensor apparatuses for measuring respective environmental characteristics on the first surface of the sensor casing; the sensor level adjustment element comprising plastic material that exhibits permanent compression in response to being subjected to a pressure that exceeds a threshold pressure and having a first surface for interfacing the sensor casing and a second surface for interfacing a bottom of the recess; and an installation sleeve for securing the road sensor apparatus to the recess, wherein the sensor casing and the sensor level adjustment element are arranged adjacent to each other and wherein at least the sensor casing is arranged within the installation sleeve such that the sensor casing is moveable with respect to the installation sleeve in response to a pressure that exceeds said threshold pressure being applied on its first surface.

According to another example embodiment, an arrangement is provided, the arrangement comprising a pavement covering an area intended for vehicular traffic, the pavement having a recess arranged therein and a road sensor apparatus according to the example embodiment described in the foregoing installed in said recess such that the first surface of the sensor casing is by a predefined margin below the level of a surface of the pavement and that the second surface of the sensor level adjustment element is arranged against a bottom of said recess.

The subject technology of the present invention is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into an independent clause, e.g., Clause 1. The other clauses can be presented in a similar manner. The following is a non-limiting summary of some examples presented herein.

Clause 1. A road sensor apparatus for installation in a recess arranged in a pavement for measuring one or more environmental characteristics on a surface of the pavement, the road sensor apparatus comprising:

a sensor casing comprising a first surface for interfacing environmental conditions on the surface of the pavement, a second surface for interfacing a sensor level adjustment portion, and a sensor portion including one or more sensor apparatuses for measuring respective environmental characteristics on the first surface of the sensor casing;

the sensor level adjustment element comprising plastic material that exhibits permanent compression in response to being subjected to a pressure that exceeds a threshold pressure and having a first surface for interfacing the sensor casing and a second surface for interfacing a bottom of the recess; and an installation sleeve for securing the road sensor apparatus to the recess, wherein the sensor casing and the sensor level adjustment element are arranged adjacent to each other and wherein at least the sensor casing is arranged within the installation sleeve such that the sensor casing is moveable with respect to the installation sleeve in response to a pressure that exceeds said threshold pressure being applied on its first surface.

Clause 2. A road sensor apparatus according to clause 1, wherein the first surface of the sensor level adjustment element is attached to the second surface of the sensor casing such that the sensor level adjustment element is moveable with respect to the installation sleeve.

Clause 3. A road sensor apparatus according to clause 1, wherein the first surface of the sensor level adjustment element is arranged adjacent to the second surface of the sensor casing such that the sensor casing is further moveable with respect to the sensor level adjustment element.

Clause 4. A road sensor apparatus according to any of clauses 1 to 3, wherein the sensor level adjustment element comprises plastic material having a compression strength in a range from 250 to 750 kPa.

Clause 5. A road sensor apparatus according to any of clauses 1 to 4, wherein the sensor level adjustment element comprises extruded polystyrene.

Clause 6. A road sensor apparatus according to any of clauses 1 to 5, wherein the sensor casing is made of a substantially non-deformable material that is able to withstand at least pressures that are smaller than or equal to said threshold pressure substantially without deformation.

Clause 7. A road sensor apparatus according to any of clauses 1 to 6, wherein the first surface of the sensor casing comprises a substantially planar surface.

Clause 8. A road sensor apparatus according to any of clauses 1 to 7, wherein the longest diameter or the longest diagonal of the first surface of the sensor casing is smaller than 100 millimeters.

Clause 9. A road sensor apparatus according to any of clauses 1 to 8, wherein the installation sleeve encloses at least the sensor casing apart from its first surface.

Clause 10. A road sensor apparatus according to any of clauses 1 to 9, wherein the installation sleeve comprises a polyvinyl chloride, PVC, film.

Clause 11. A road sensor apparatus according to any of clauses 1 to 10, wherein said one or more sensor apparatuses comprise one or more of the following:

a temperature sensor for measuring temperature on the first surface of the sensor casing;

one or more further temperature sensors for measuring respective temperatures at one or more distances from the first surface of the sensor casing.

an optical measurement arrangement that includes a light transmitter and a light sensor for measuring thickness of a liquid layer on the first surface of the sensor casing based on backscattering of light;

an arrangement of two or more electrodes for measuring one or more electrical characteristics on the first surface of the sensor casing.

Clause 12. A road sensor apparatus according to any of clauses 1 to 11, arranged for installation in the recess in the pavement such that the first surface of the sensor casing is arranged by a predefined margin below the level of a surface of the pavement and that the second surface of the sensor level adjustment element is arranged against a bottom of the recess.

Clause 13. An arrangement comprising:

a pavement covering an area intended for vehicular traffic, the pavement having a recess arranged therein;

a road sensor apparatus according to any of clauses 1 to 12 installed in said recess such that the first surface of the sensor casing is by a predefined margin below the level of a surface of the pavement and that the second surface of the sensor level adjustment element is arranged against a bottom of said recess.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 schematically illustrates some components of a road sensor apparatus according to an example.

DESCRIPTION OF SOME EMBODIMENTS

Figure 1:
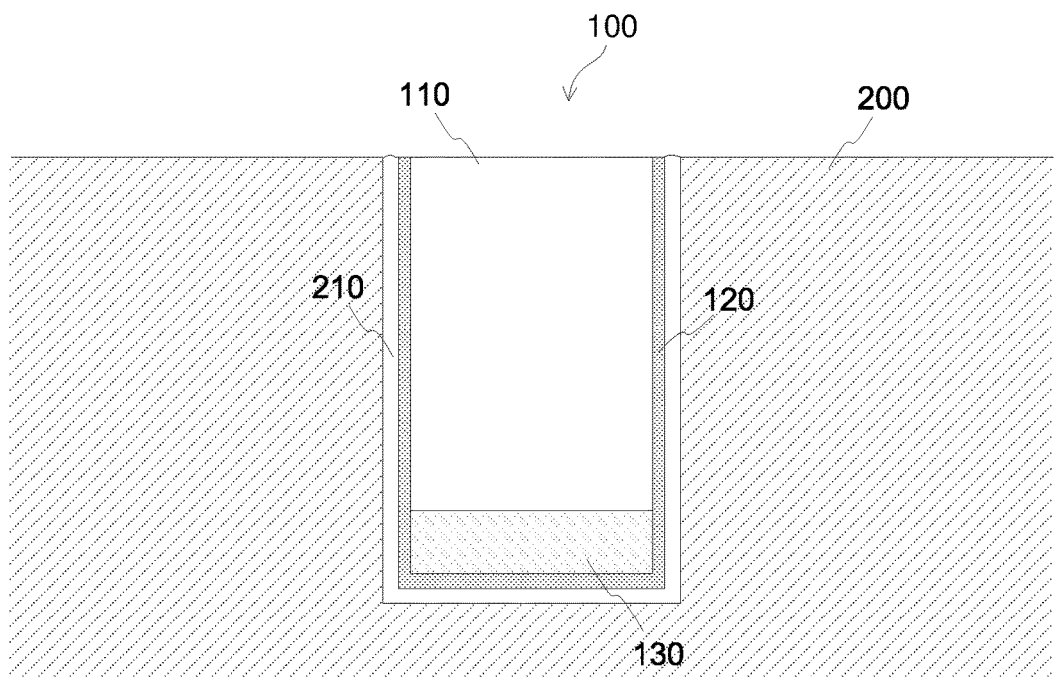

FIG. 1 schematically illustrates some components of a road sensor apparatus 100 according to an example embedded in a recess arranged in a pavement 200 via a sealing layer 210. The road sensor apparatus 100 comprises a sensor casing 110 and a sensor level adjustment element 130 arranged within an installation sleeve 120. The installation sleeve 120 may comprise, at least conceptually, a side portion for interfacing the sides of the recess and a bottom portion for interfacing the bottom of the recess. Throughout the present disclosure, the term pavement is applied to refer to a durable surfacing material laid on an area intended for vehicular traffic, such as on a road, a street, a runway, etc. Such surfacing material is also generally referred to as a road surface. However, for clarity of description, the term pavement is applied herein, while in general the terms pavement and road surface may be used interchangeably.

Figure 2:
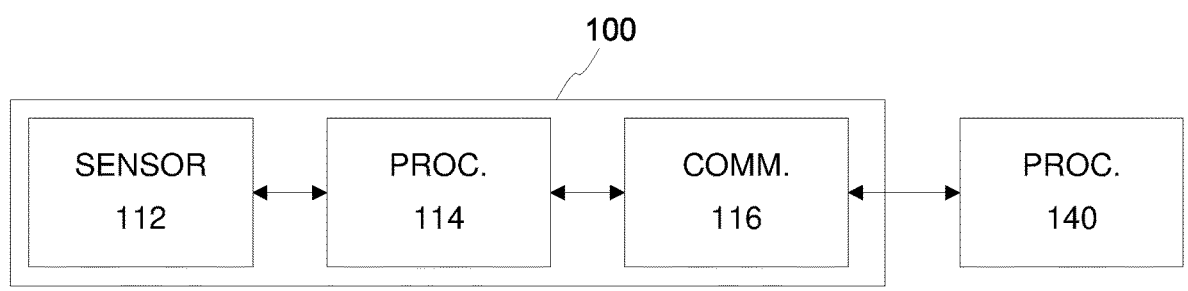
FIG. 2 illustrates a block diagram of some elements of the road sensor apparatus arranged inside the sensor casing according to an example.
Figure 3:
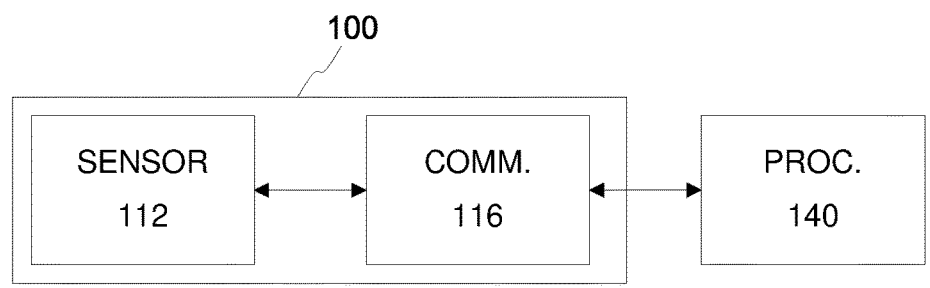
FIG. 3 illustrates a block diagram of some elements of the road sensor apparatus arranged inside the sensor casing according to an example.

FIG. 2 illustrates a block diagram of some elements of the road sensor apparatus 100 arranged inside the sensor casing 110 according to an example. In this regard, the road sensor apparatus 100 includes a sensor portion that comprises one or more sensor apparatuses for measuring respective environmental characteristics that pertain to conditions on the pavement 200, a processing portion 114 arranged to acquire respective measurement data from the one or more sensor apparatuses of the sensor portion 112 and a communication portion 116 arranged to provide communicative coupling to a processing unit 140 via a wired or wireless communication link and/or communication network. FIG. 3 illustrates a block diagram of some elements of the road sensor apparatus 100 arranged inside the sensor casing 110 according to another example, where the processing portion 114 of FIG. 2 is omitted and the functionality described therefor in the following may be provided in the processing unit 140 instead, mutatis mutandis.

The sensor casing 110 defines a space therein, and the space within the sensor casing 110 houses at least some of the elements of the road sensor apparatus 100 illustrated via examples of FIGS. 2 and 3, i.e. the sensor portion 112 and the communication portion 116, possibly together with the processing portion 114. The sensor casing 110 has a first surface for interfacing environmental conditions on a surface of the pavement 200 and a second surface for interfacing the sensor level adjustment element 130, wherein the second surface may be a surface that is substantially opposite to the first surface. The sensor level adjustment element 130 has a first surface for interfacing the sensor casing 110 and a second surface for interfacing a bottom of the recess in the pavement 200 within which the road sensor apparatus 100 is to be embedded for operation, wherein the second surface may be a surface that is substantially opposite to the first surface.

At least one of the one or more sensor apparatuses of the sensor portion 112 may be disposed within the sensor casing 110 close to its first surface, such that they are able to measure the respective environmental characteristics via the first surface of the sensor casing 120. Consequently, when the road sensor apparatus 100 is installed into the recess in the pavement 200, the sensor level adjustment element 130 is located below the sensor casing 110 and arranged against the bottom portion of the installation sleeve 120 and hence against (the sealing layer 210 in) the bottom of the recess, whereas the first surface of the sensor casing 110 is preferably arranged by a predefined margin below the level of the surface of the pavement 200, which margin may be for example in a range from 0 to 3 millimeters (mm), depending e.g. on the shape and size of the first surface of the sensor casing 110 and/or on characteristics of the sensor level adjustment element 130. The predefined margin may be also referred to as an installation depth of the road sensor apparatus 100.

The respective first and second surfaces of the sensor casing 110 and the sensor level adjustment element 130 are typically, but not necessarily, respective substantially planar surfaces. The first surface of the sensor casing 110 may be also referred to as its top surface, first side or top side, whereas the second surface of the sensor casing 110 may be also referred to as its bottom surface, second side or bottom side. Along similar lines the first surface of the sensor level adjustment element 130 may be referred to as its top surface, first side or top side, whereas the second surface of the sensor level adjustment element 130 may be referred to as its bottom surface, second side or bottom side.

The sensor level adjustment element 130 may comprise or it may be made of plastic material that exhibits permanent compression in response to being subjected to a pressure that exceeds a threshold pressure, which is characteristic to a construction of the sensor level adjustment element 130 and/or the plastic material applied therein. In other words, when a threshold-exceeding pressure is applied on the top surface or on the bottom surface of the sensor level adjustment element 130, plasticity of the sensor level adjustment element 130 results in compression of the sensor level adjustment element 130 such that the distance between its top and bottom surfaces becomes smaller. Moreover, due to the permanent nature of the plastic deformation, the sensor level adjustment element 130 retains its compressed form also when the threshold-exceeding pressure is no longer applied on its top or bottom surface. The deformation/compression characteristics of the sensor level adjustment element 130 are described in further detail via examples provided in the following.

The sensor casing 110 is made of durable and substantially non-deformable and/or incompressible (e.g. rigid or stiff) material that is able to withstand at least pressures that are smaller than or equal to the threshold pressure of the sensor level adjustment element 130 substantially without deformation. Consequently, such a pressure applied on the top surface of the sensor casing 110 results in the bottom surface of the sensor casing 110 exerting a corresponding pressure on the sensor level adjustment element 130. As a non-limiting example in this regard, the sensor casing 110 may be made of two-component polyurethane elastomer.

The size and shape of the sensor casing 110 are selected according to circumstances, e.g. in view of the size and/or other requirements of the components arranged therein. In an example, along the lines described in the foregoing, the top surface of the sensor casing 110 may comprise a planar or substantially planar surface and it may have an area that is significantly smaller than a typical footprint of a tire of a vehicle expected to roll over the road sensor apparatus 100 when arranged in its location of usage. With such an area size and with the top surface arranged on a level that at least by the predefined margin below the surface of the pavement 200, a pressure exerted on the top surface of the sensor casing 110 by a wheel of a vehicle rolling over the road sensor apparatus 100 does not exceed the above-described threshold pressure, whereas in a scenario where the top surface is on a level that is closer to the surface of the pavement 200 (or when the top surface is above the surface of the pavement 200) the threshold pressure is exceeded. As a non-limiting example in this regard, the top surface of the sensor casing 110 may have a substantially rectangular area whose diagonal is at most 100 mm or a substantially circular area whose diameter is at most 100 mm. In an example, the diagonal of a rectangular top surface or the diameter of a circular top surface may be approximately 55 mm.

The sensor casing 110 may have an overall shape that approximates a rectangular cuboid or a cylinder having a height (from its top surface to its bottom surface) in a range from 100 to 600 mm, e.g. approximately 320 mm. In other examples, the top surface of the sensor casing 110 may not be substantially planar and/or the sensor casing 110 may have a shape different from a substantially rectangular or circular one (e.g. hexagonal, elliptical, . . . ) having its longest diagonal or diameter at most 100 mm and the overall shape of the sensor casing 110 may be different from one that approximates a rectangular cuboid or a cylinder).

The sensor level adjustment element 130 preferably has a shape that follows that of the sensor casing 110 in that its cross-section (in a direction perpendicular to its top and bottom surfaces) is not larger than that of the sensor casing 110, thereby enabling arrangement of the sensor level adjustment element 130 together with the sensor casing 110 within the installation sleeve 120. As an example in this regard, the cross-section of the sensor level adjustment element 130 may be substantially similar to that of the sensor casing 110, whereas in another example the cross-section of the sensor level adjustment element 130 may be smaller than that of the sensor casing 110. A thickness of the sensor level adjustment element 130 (e.g. the distance between its top and bottom surfaces) may be in a range from 15 to 50 mm, e.g. 30 mm, depending on the compression strength of the plastic material applied in the sensor level adjustment element 130 (and hence on the threshold pressure thereof) and/or on the desired amount of level adjustment enabled by the sensor level adjustment element 130.

The threshold pressure of the sensor level adjustment element 130 may be the or substantially the same as a compression strength of the plastic material of the sensor level adjustment element 130. In general, the threshold pressure needs to be sufficiently high to avoid compression of the sensor level adjustment element 130 to take place when the road sensor apparatus 110 is positioned in its intended installation depth at the predefined margin below the surface of the pavement 200 while on the other hand the threshold pressure needs to be sufficiently low to ensure compression when the top surface of the road sensor apparatus 100 is exposed at or above the surface of the pavement 200. Hence, according to an example, depending on the size and shape of the top surface of the sensor casing 110, the plastic material applied in the sensor level adjustment element 130 may comprise any plastic material having a compression strength in a range from 250 to 750 kPa, thereby resulting in the threshold pressure in the range from 250 to 750 kPa. As a non-limiting example, the sensor level adjustment element 120 may comprise extruded polystyrene that may have a compression strength of approximately 300 kPa, thereby resulting in the threshold pressure of approximately 300 kPa.

The sensor casing 110 and the sensor level adjustment element 130 may be arranged within the installation sleeve 120 such that at least the sensor casing 110 is able to move with respect to the installation sleeve 120 in response a pressure being applied on its top surface, the bottom surface of the sensor casing 110 thereby exerting a corresponding pressure on the sensor level adjustment element 130. The installation sleeve 120 may comprise a film that encloses an assembly formed by the sensor casing 110 and the sensor level adjustment element 130 apart from the top surface of the sensor casing 110. According to a non-limiting example, the installation sleeve 120 may comprise or be made of, for example, a polyvinyl chloride (PVC) film, which may have a thickness in a range from 100 to 200 micrometers (μm), e.g. 150 μm.

The road sensor apparatus 100 may be secured in its position in the recess arranged in the pavement 200 via the sealing layer 210 that serves to attach the outer surface of the installation sleeve 120 firmly in its position with respect to the recess. The sealing layer 210 may comprise or consist of a deformable sealing material that will subsequently solidify into the sealing layer 210 after the road sensor apparatus 100 has been arranged in its desired position with respect to the recess in the pavement 200. In this regard, the sealing material may comprise, for example, two-component polyurethane elastomer. Consequently, the above-described movement of the sensor casing 110 with respect to the installation sleeve 120 results in the sensor casing 110 moving (downwards) with respect to the pavement 200 when a sufficient pressure is applied on its top surface.

As an example regarding an arrangement of the sensor level adjustment element 130 with respect to other components of the road sensor assembly 100, the sensor casing 110 and the sensor level adjustment element 130 may be arranged within the installation sleeve 120 such that the first surface of the sensor level adjustment element 130 is attached to the second surface of the sensor casing 110, either directly or via a fitting assembly. In such an arrangement the sensor level adjustment element 130 is likewise moveable with respect to the installation sleeve 120 and a pressure applied on the top surface of the sensor casing 110 results in the sensor level adjustment element 130 moving along with the sensor casing 110. Consequently, when the road sensor apparatus 100 is installed in the recess in the pavement 200 with the second surface of the sensor level adjustment element 130 arranged against the bottom portion of the installation sleeve 120 and hence against (the sealing layer 210 at) the bottom of the recess, movement of the sensor casing 110 due to pressure applied on its first surface results in corresponding pressure to be applied on the sensor level adjustment element 130.

According to another example in this regard, the sensor casing 110 and the sensor level adjustment element 130 may be arranged within the installation sleeve 120 such that the sensor level adjustment element 130 is, additionally or alternatively, attached to the installation sleeve 120 (e.g. to the side portion and/or to the bottom portion thereof) in a manner that does not allow movement with respect to the installation sleeve, thereby making the sensor level adjustment element 130 non-moveable with respect to the installation sleeve 120. In such an arrangement a pressure applied on the top surface of the sensor casing 110 results in the bottom surface of the sensor casing 110 moving towards the sensor level adjustment element 130 and, consequently, exerting a corresponding pressure thereon.

Figure 4:
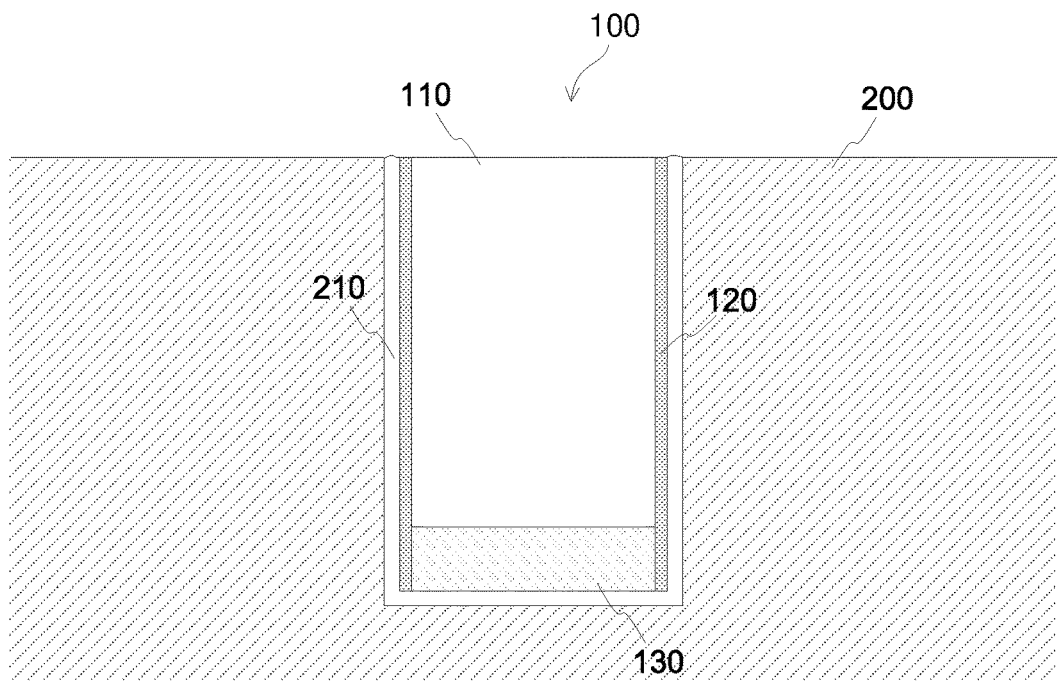
FIG. 4 schematically illustrates some components of a road sensor apparatus according to an example, FIG. 5 schematically illustrates some components of a road sensor apparatus according to an example, FIG. 6 schematically illustrates some components of a road sensor apparatus according to an example.

In a further example, as schematically illustrated in FIG. 4, the installation sleeve 120 may be provided without the bottom portion, thereby providing an arrangement where the road sensor 100 may be arranged in the recess in the pavement 200 such that the bottom surface of the sensor level adjustment element 140 is directly facing (the sealing layer 210 at) the bottom of the recess without the installation sleeve 120 therebetween. In such an arrangement, the sensor level adjustment element 140 may be attached to the bottom surface of the sensor casing 110 and/or to the side portion of the installation sleeve 120.

Figure 5:
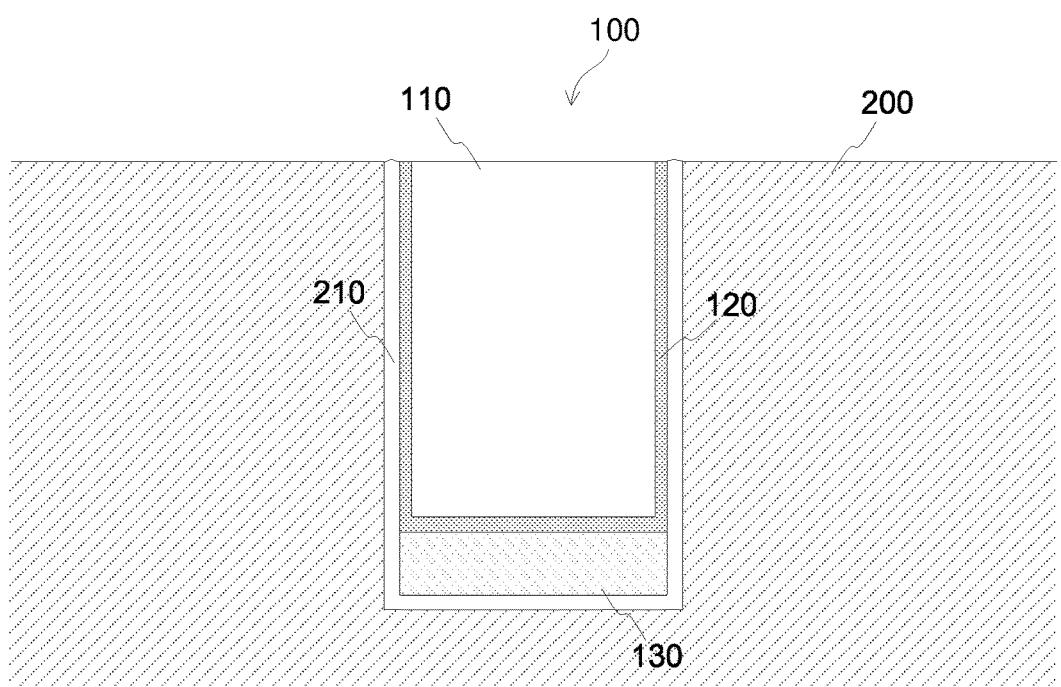

FIG. 5 schematically illustrates a further example regarding the arrangement of the sensor casing 110 and the sensor level adjustment element 130 with respect to each other and with respect to the installation sleeve 120. In this example, the installation sleeve 120 encloses the sensor casing 110 apart from its top surface, whereas the sensor level adjustment element 130 is arranged adjacent to the bottom surface of the sensor casing 110 with the bottom portion of the installation sleeve 120 therebetween. Hence, (the top surface of) the sensor level adjustment element 130 may be attached to the bottom portion of the installation sleeve or the sensor level adjustment element 130 may be arranged at the bottom of the recess in the pavement 200 (against the sealing layer 210) before arranging the sensor casing 110 together with the installation sleeve 120 thereon. In this example, the installation sleeve 120, or at least the bottom portion thereof, needs to be flexible or it needs to break upon the threshold-exceeding pressure being applied thereon to allow for the movement of the sensor casing 110 to transfer the threshold-exceeding pressure applied on the top surface thereof to the sensor level adjustment element 130.

Figure 6:
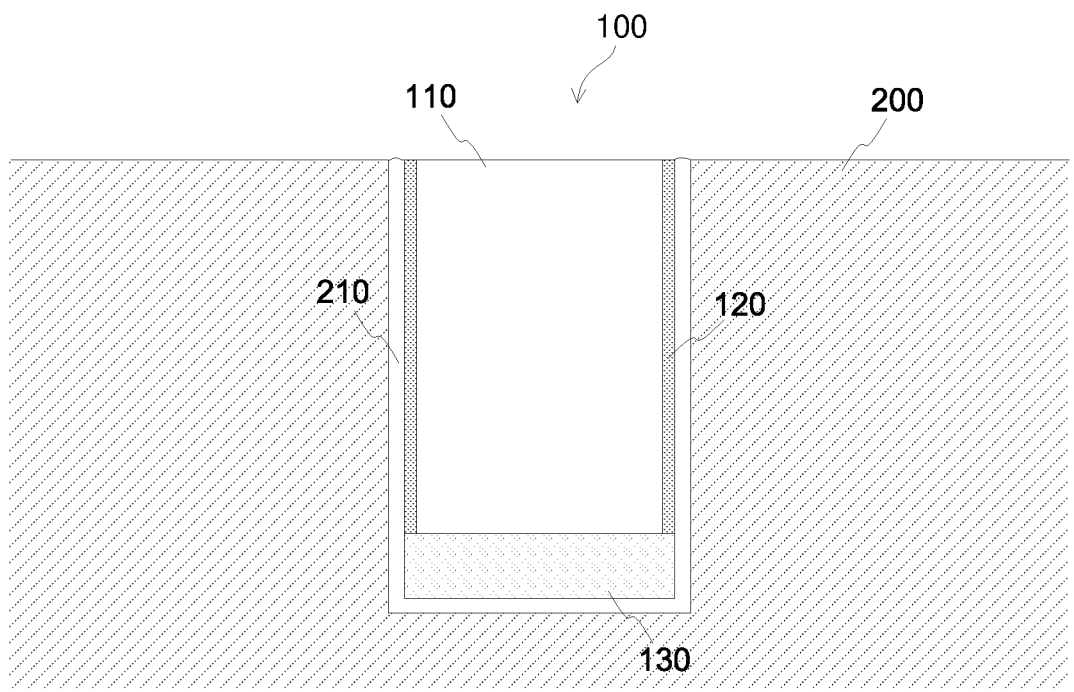

FIG. 6 schematically illustrates a further example regarding the arrangement of the sensor casing 110 and the sensor level adjustment element 130 with respect to each other and with respect to the installation sleeve 120. Like in the example of FIG. 4, also in this example the installation sleeve 120 is provided without the bottom portion and hence the bottom surface of the sensor casing 110 is directly facing the top surface of the sensor level adjustment element 130 without the installation sleeve 120 therebetween while the bottom surface of the sensor level adjustment element 130 is arranged against (the sealing layer 210 at) the bottom of the recess.

Regardless of the manner of arrangement of the sensor level adjustment element 130 with respect to the installation sleeve 120 in terms of moveability therebetween, when the road sensor apparatus 100 is installed in the recess arranged in the pavement 200, a pressure applied on the top surface of the sensor casing 110 results in the corresponding pressure to be applied on the sensor level adjustment element 130, thereby resulting in the above-described plastic deformation of the sensor level adjustment element 130 in case the pressure applied on the top surface of the sensor casing 110 exceeds the above-described threshold pressure of the sensor level adjustment element 130. Moreover, due to permanent nature of the plastic deformation of the sensor level adjustment element 130, the sensor casing 110 remains in its changed position with respect to the installation sleeve 120 also when the threshold-exceeding pressure is no longer applied on its top surface, thereby maintaining the desired level of the top surface of the sensor casing 110 with respect to the surface of the pavement 200.

Along the lines described in the foregoing, the road sensor apparatus 100 may be installed into a recess arranged in the pavement 200 via securing the outer surface of the installation sleeve 120 to an inner surface of the recess via the sealing layer 210. In this regard, the depth of the recess is chosen such that it substantially matches the height of the road sensor apparatus 100, i.e. the distance from the top surface of the sensor casing 110 to the bottom surface of the sensor level adjustment element 120 or to the bottom portion of the installation sleeve 120 (whichever applies) in consideration of the predefined margin between the level of the top surface of the sensor casing 110 and the surface of the pavement 200 and the thickness of the sealing layer 210 at the bottom of the recess after installation. Installation of the road sensor apparatus 100 in the recess may involve inserting, into the recess, deformable sealing material that will subsequently solidify into the sealing layer 210 and arranging the road sensor apparatus 100 in the recess in a desired position with respect to the recess and the pavement 200 before the sealing material solidifies such that the top surface of the sensor casing 110 is arranged by the predefined margin below the surface of the pavement 200 while the bottom surface of the sensor level adjustment element 130 is arranged against (the sealing layer 210 at) the bottom of the recess (either directly or with the bottom portion of the installation sleeve 210 therebetween).

In this arrangement with respect to the pavement 200 and the recess arranged therein, the road sensor apparatus 100 serves to measure environmental characteristics that are descriptive of conditions on the surface of the pavement 200 at the location of the road sensor apparatus 100. Since the top surface of the sensor casing 110 is slightly below the surface of the pavement 200, no significant pressure is applied thereto by wheels of vehicles rolling over the road sensor apparatus 100 and the sensor casing 110 remains in its position with respect to pavement 200 (and with respect to the installation sleeve 120). On the other hand, due to gradual wear of the surface of the pavement 200 caused by wheels of vehicles rolling over the pavement 200 and by maintenance operations applied to the pavement 200 (e.g. by snow removal by machinery such as snow ploughs), the surface of the pavement 200 gradually comes closer to the top surface of the sensor casing 110 or even at level with top surface of the sensor casing 110, thereby exposing the top surface of the sensor casing 110 to an increased pressure from wheels of vehicles rolling over the road sensor apparatus 100.

With sufficient wear of the pavement 200 the pressure caused by wheels of vehicles rolling over the road sensor apparatus 100 increases to a level that exceeds the threshold pressure of the sensor level adjustment element 130, which results in compression of the sensor level adjustment element 130 and, consequently, in the sensor casing 110 moving closer to the bottom of the recess and its top surface moving (further) below the level of the surface of the pavement 200. Due to plastic characteristics of the sensor level adjustment element 130, the sensor casing 110 remains in its lowered position also when the threshold-exceeding pressure is no longer applied on the top surface thereof, thereby maintaining the position of its top surface suitably below the surface of the pavement 200. Such automated self-leveling ensures that the road sensor apparatus 100 continues to reliably measure the environmental conditions on the surface of the pavement 200 and it also avoids leaving the road sensor apparatus 100 exposed to impacts by road maintenance equipment (such as snow ploughs) applied for maintenance of the pavement 200, while on the other hand such self-leveling makes periodic manual maintenance work for keeping the top surface of the sensor casing 110 with a desired level with respect to the surface of the pavement 200 unnecessary.

The level of the top surface of the sensor casing 110 with respect to the level of the surface of the pavement 200 that results in the threshold-exceeding pressure being applied thereon due to wheels of vehicles rolling over it depends, for example, on characteristics of the plastic material applied in the sensor level adjustment element 130 and the construction of the sensor level adjustment element 130, whereas also characteristic of the sensor casing 110, especially with respect to the shape and size of its top surface, may have an effect on the difference in respective levels of the top surface of the sensor casing 110 and the surface of the pavement 200 required for the threshold-exceeding pressure being applied on the top surface of the sensor casing 110. Moreover, the size of the footprint of the wheel rolling over the sensor apparatus 100 likewise have an effect on the level difference between the top surface of the sensor casing 110 and the surface of the pavement 200 that results in self-leveling of the road sensor apparatus 100. As a non-limiting example, characteristics of components of the road sensor apparatus 100 may be selected such that the threshold-exceeding pressure is triggered when the level difference between the top surface of the sensor casing 110 and the surface of the pavement 200 is smaller than the predefined margin described in the foregoing. However, due to a number of variables of a practical usage scenario of the road sensor apparatus 100 having an effect in this regard, the predefined margin discussed herein is necessarily an approximation.

Referring now back to the examples of FIGS. 2 and 3, the sensor portion 112 may comprise a respective sensor apparatus for observing one or more environmental characteristics that are descriptive of conditions on the surface of the pavement 200. Non-limiting examples in this regard include the following:

- a first temperature sensor arranged for measuring temperature on the top surface of the sensor casing 110;
- one or more further temperature sensors arranged for measuring ground temperatures at respective positions with respect to the sensor casing 110, e.g. at a respective predefined distances from the top surface of the sensor casing 110;
- an optical measurement arrangement including a light transmitter and a light detector for measuring a thickness of a liquid layer on the top surface of the sensor casing 110 based on backscattering of light;
- an arrangement of two or more electrodes arranged for measuring one or more electrical characteristic (such as conductivity) on the top surface of the sensor casing 110.

The processing portion 114 illustrated in the example of FIG. 2 may comprise a microprocessor, a microcontroller or a corresponding programmable computing apparatus for acquiring respective measurement data from the one or more sensor apparatuses according to a predefined schedule, e.g. at predefined time intervals. In an example, the processing portion 114 may provide the measurement data acquired from the sensor portion 112 as such to the communication portion 116 for forwarding to the processing unit 140 via the communicative coupling. In another example, additionally or alternatively, the processing portion 116 may apply predefined processing to derive processed measurement data on basis of the measurement data obtained from the sensor portion 112 and provide the processed measurement data to the communication portion 116 for forwarding to the processing unit 140. The processed measurement data may be derived on basis of respective measurement data obtained from one or more sensor apparatuses, e.g. respective measurement data obtained from a single sensor apparatus over time, on basis of instantaneous (e.g. the most recent) values of respective sensor data received from two or more sensors, or on basis of respective measurement data obtained from two or more sensor apparatuses over time. Non-limiting examples of such processing may include one or more of the following:

- Derivation of a surface state indication on basis of respective measurement data obtained from one or more of the sensors of the sensor portion 112 (e.g. the temperature on the top surface of the sensor casing 110, the thickness of the liquid layer on the top surface and/or the one or more electrical characteristics on the top surface), where the surface state indication may indicate one of a plurality of predefined surface states. In this regard, the plurality of predefined surface sates may include two or more of the following: dry, moist, wet, snowy, icy, frosty.
- Derivation of conductivity on the top surface of the sensor casing 110, e.g. conductivity of a liquid on the top surface of the sensor casing 110.
- Derivation of an indication of an amount of a predefined road maintenance chemical (such as a de-icing or anti-acing chemical) on the top surface of the sensor casing 110 based on conductivity on the top surface.
- Derivation of an indication of sufficient or insufficient amount of the predefined road maintenance chemical on the top surface of the sensor casing 110 in view of the current surface state.

Along the lines described in the foregoing, the communication portion 116 may provide the communicative coupling to the processing unit 140 via a wired or wireless communication medium. The communicative coupling may enable provision of the measurement data from the road sensor apparatus 100 to the processing unit 140 and it may further enable providing control information from the processing unit 140 to the road sensor apparatus 100. In an example, the communicative coupling may be provided via one or more electrical cables. In such a scenario the communication portion 116 serves as an interface between the processing portion 116 and the one or more electrical cables, e.g. in order to convert the measurement data from the format applied by the processing portion 114 into a format (more) suitable for transmission via the one or more electrical cables. In another example, the communicative coupling may be provided using a suitable wireless communication technique known in the art, such as cellular wireless communication or short-range wireless communication (such as Bluetooth or Wi-Fi). In such a scenario the communication portion 116 may serve as a transmitter or a transceiver that is capable of communicating using the employed wireless communication technique.

Along the lines described in the foregoing, the processing unit 140 may be communicatively coupled to the road sensor apparatus 100 installed in a certain location in the pavement 200 and the processing unit 140 may receive the measurement data from the road sensor apparatus 100. Along the lines described in the foregoing, the data received from the road sensor apparatus 100 may comprise the measurement data acquired from the sensor portion 112 as such or processed measurement data derived by the processing portion 114. In the former scenario, in some examples, the processing of measurement data described in the foregoing with references to the processing portion 114 may be carried out in the processing unit 140 instead, thereby obtaining the processed measurement data on basis of the measurement data acquired from the sensor portion 112. The processing unit 140 may process (e.g. convert), if needed, the obtained measurement data into a format suitable for presentation to a human operator and display the converted data via a display device coupled to the processing unit 140 as an indication of pavement surface conditions in and close to the certain location. Additionally or alternatively, the processing unit 140 may store the measurement data obtained from the road sensor apparatus 100 in a memory provided in the processing unit 140 for subsequent use therein.

In an example, the processing unit 140 may receive respective measurement data from a plurality of road sensor apparatuses 100 installed in respective plurality of locations in the pavement 200 within a certain area and the processing unit 140 may receive respective measurement data from the plurality of road sensor apparatuses 100. In an example, the respective measurement data originating from the plurality of road sensor apparatuses 100 may be processed separately in a manner described above for a single road sensor apparatus 100 and displayed via the display device as respective indications of pavement surface conditions in the respective plurality of locations. In another example, the processing unit 140 may process the respective measurement data originating from the plurality of sensor apparatuses 100 may be combined into combined measurement data before displaying the combined measurement data via the display. In this regard, depending on the type of underlying measurement data, the combination of measurement data may involve e.g. one of an average, a median, a mode, a minimum, a maximum or some other statistical measure derived based on respective measurement data originating from the plurality of road sensor apparatuses 100.

Figure 7:
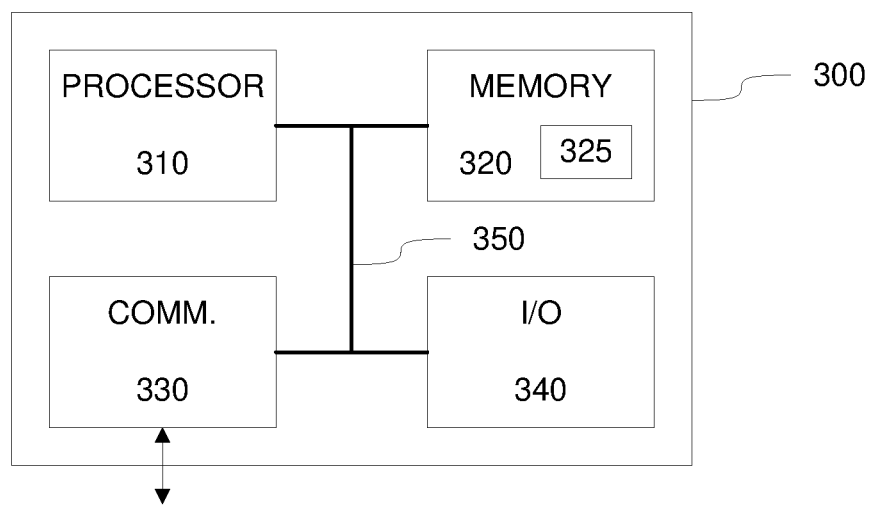
FIG. 7 illustrates a block diagram of some components of an apparatus according to an example.

FIG. 7 illustrates a block diagram of some components of an apparatus 300 that may be employed to implement the processing portion 114 or the processing unit 140 described in the foregoing. The apparatus 300 comprises a processor 310 and a memory 320. The memory 320 may store data and computer program code 325. The apparatus 300 may further comprise communication means 330 for wired or wireless communication with other apparatuses and/or user I/O (input/output) components 340 that may be arranged, together with the processor 310 and a portion of the computer program code 325, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 300 are communicatively coupled to each other via a bus 350 that enables transfer of data and control information between the components.

The memory 320 and a portion of the computer program code 325 stored therein may be further arranged, with the processor 310, to cause the apparatus 300 to perform at least some aspects of respective operation of the processing portion 114 or the processing unit 140 described in the foregoing. The processor 310 is configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement at least some aspects of respective operation of the processing portion 114 or the processing unit 140 described in the foregoing when loaded into the processor 310. As an example, the computer program code 325 may include a computer program consisting of one or more sequences of one or more instructions. The processor 310 is able to load and execute the computer program by reading the one or more sequences of one or more instructions included therein from the memory 320. The one or more sequences of one or more instructions may be configured to, when executed by the processor 310, cause the apparatus 300 to perform at least some aspects of respective operation of the processing portion 114 or the processing unit 140 described in the foregoing. Hence, the apparatus 300 may comprise at least one processor 310 and at least one memory 320 including the computer program code 325 for one or more programs, the at least one memory 320 and the computer program code 325 configured to, with the at least one processor 310, cause the apparatus 300 to perform at least some aspects of respective operation of the processing portion 114 or the processing unit 140 described in the foregoing.

The computer program code 325 may be provided e.g. a computer program product comprising at least one computer-readable non-transitory medium having the computer program code 325 stored thereon, which computer program code 325, when executed by the processor 310 causes the apparatus 300 to perform at least some aspects of respective operation of the processing portion 114 or the processing unit 140 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. A road sensor apparatus for installation in a recess arranged in a pavement for measuring one or more environmental characteristics on a surface of the pavement, the road sensor apparatus comprising:
   a sensor casing comprising a first surface for interfacing environmental conditions on the surface of the pavement, a second surface for interfacing a sensor level adjustment element, and a sensor portion including one or more sensor apparatuses for measuring respective environmental characteristics on the first surface of the sensor casing;
   the sensor level adjustment element comprising plastic material that exhibits permanent compression in response to being subjected to a pressure that exceeds a threshold pressure and having a first surface for interfacing the sensor casing and a second surface for interfacing a bottom of the recess; and
   an installation sleeve for securing the road sensor apparatus to the recess, wherein the sensor casing and the sensor level adjustment element are arranged adjacent to each other and wherein at least the sensor casing is arranged within the installation sleeve such that the sensor casing is moveable with respect to the installation sleeve in response to a pressure that exceeds said threshold pressure being applied on its first surface.

2. The road sensor apparatus according to claim 1, wherein the first surface of the sensor level adjustment element is attached to the second surface of the sensor casing such that the sensor level adjustment element is moveable with respect to the installation sleeve.

3. The road sensor apparatus according to claim 1, wherein the first surface of the sensor level adjustment element is arranged adjacent to the second surface of the sensor casing such that the sensor casing is further moveable with respect to the sensor level adjustment element.

4. The road sensor apparatus according to claim 1, wherein the sensor level adjustment element comprises plastic material having a compression strength in a range from 250 to 750 kPa.

5. The road sensor apparatus according to claim 1, wherein the sensor level adjustment element comprises extruded polystyrene.

6. The road sensor apparatus according to claim 1, wherein the sensor casing is made of a substantially non-deformable material that is able to withstand at least pressures that are smaller than or equal to said threshold pressure substantially without deformation.

7. The road sensor apparatus according to claim 1, wherein the first surface of the sensor casing comprises a substantially planar surface.

8. The road sensor apparatus according to claim 1, wherein a longest diameter or a longest diagonal of the first surface of the sensor casing is smaller than 100 millimeters.

9. The road sensor apparatus according to claim 1, wherein the installation sleeve encloses at least the sensor casing apart from its first surface.

10. The road sensor apparatus according to claim 1, wherein the installation sleeve comprises at least one of a polyvinyl chloride, PVC, or film.

11. The road sensor apparatus according to claim 1, wherein said one or more sensor apparatuses comprise one or more of the following:
- a temperature sensor for measuring temperature on the first surface of the sensor casing;
- one or more further temperature sensors for measuring respective temperatures at one or more distances from the first surface of the sensor casing,
- an optical measurement arrangement that includes a light transmitter and a light sensor for measuring thickness of a liquid layer on the first surface of the sensor casing based on backscattering of light; or
- an arrangement of two or more electrodes for measuring one or more electrical characteristics on the first surface of the sensor casing.

12. The road sensor apparatus according to claim 1, arranged for installation in the recess in the pavement such that the first surface of the sensor casing is arranged by a predefined margin below the level of a surface of the pavement and that the second surface of the sensor level adjustment element is arranged against a bottom of the recess.

13. An arrangement comprising:
a pavement covering an area intended for vehicular traffic, the pavement having a recess arranged therein;
a road sensor apparatus installed in said recess such that a first surface of a sensor casing of the road sensor apparatus is by a predefined margin below a level of a surface of the pavement and that a second surface of a sensor level adjustment element of the road sensor apparatus is arranged against a bottom of said recess;
wherein the road sensor apparatus is installed in the recess for measuring one or more environmental characteristics on the surface of the pavement, the road sensor apparatus comprising:
the sensor casing comprising the first surface for interfacing environmental conditions on the surface of the pavement, a second surface for interfacing a sensor level adjustment element, and a sensor portion including one or more sensor apparatuses for measuring respective environmental characteristics on the first surface of the sensor casing;
the sensor level adjustment element comprising plastic material that exhibits permanent compression in response to being subjected to a pressure that exceeds a threshold pressure and having a first surface for interfacing the sensor casing and the second surface for interfacing the bottom of the recess; and
an installation sleeve for securing the road sensor apparatus to the recess, wherein the sensor casing and the sensor level adjustment element are arranged adjacent to each other and wherein at least the sensor casing is arranged within the installation sleeve such that the sensor casing is moveable with respect to the installation sleeve in response to a pressure that exceeds said threshold pressure being applied on its first surface.

14. The arrangement according to claim 13, wherein the first surface of the sensor level adjustment element is attached to the second surface of the sensor casing such that the sensor level adjustment element is moveable with respect to the installation sleeve.

15. The arrangement according to claim 13, wherein the first surface of the sensor level adjustment element is arranged adjacent to the second surface of the sensor casing such that the sensor casing is further moveable with respect to the sensor level adjustment element.

16. The arrangement according to claim 13, wherein the sensor level adjustment element comprises plastic material having a compression strength in a range from 250 to 750 kPa.

17. The arrangement according to claim 13, wherein the sensor level adjustment element comprises extruded polystyrene.

18. The arrangement according to claim 13, wherein the sensor casing is made of a substantially non-deformable material that is able to withstand at least pressures that are smaller than or equal to said threshold pressure substantially without deformation.

19. The arrangement according to claim 13, wherein the first surface of the sensor casing comprises a substantially planar surface.

20. The arrangement according to claim 13, wherein a longest diameter or a longest diagonal of the first surface of the sensor casing is smaller than 100 millimeters.

21. The arrangement according to claim 13, wherein the installation sleeve encloses at least the sensor casing apart from its first surface.

22. The arrangement according to claim 13, wherein the installation sleeve comprises at least one of a polyvinyl chloride, PVC, or film.

23. The arrangement according to claim 13, wherein the one or more sensor apparatuses further comprises one or more of the following:
- a temperature sensor for measuring temperature on the first surface of the sensor casing;
- one or more further temperature sensors for measuring respective temperatures at one or more distances from the first surface of the sensor casing,
- an optical measurement arrangement that includes a light transmitter and a light sensor for measuring thickness of a liquid layer on the first surface of the sensor casing based on backscattering of light; or
- an arrangement of two or more electrodes for measuring one or more electrical characteristics on the first surface of the sensor casing.

* * * * *